United States Patent [19]

Garnier et al.

[11] Patent Number: 4,671,911
[45] Date of Patent: Jun. 9, 1987

[54] CERAMIC COMPOSITE MATERIAL HAVING A CORE OF CERAMIC FIBERS COATED WITH A LAYER OF CERAMIC, AND METHOD OF PRODUCING SAME

[75] Inventors: Albert Garnier, Heyrieux; Alain G. de l'Eprevier, Le Brethon, both of France

[73] Assignee: Produits Cellulosiques Isolants-Procelis, France

[21] Appl. No.: 732,615

[22] Filed: May 10, 1985

[30] Foreign Application Priority Data

May 18, 1984 [FR] France ................ 84 07987

[51] Int. Cl.⁴ .............. B32B 18/00; C04B 41/86; C04B 41/87
[52] U.S. Cl. ........................ 264/60; 264/62; 428/68; 428/76; 428/288; 428/307.7; 428/311.5; 428/318.6; 428/319.1; 428/334; 428/338
[58] Field of Search ............ 264/60, 62; 428/68, 428/76, 288, 307.7, 311.5, 318.6, 319.1, 334, 338

[56] References Cited

U.S. PATENT DOCUMENTS

| | | | |
|---|---|---|---|
| 3,300,331 | 1/1967 | Collins | 264/60 |
| 3,395,068 | 7/1968 | Rex . | |
| 3,468,989 | 9/1969 | McMillan | 264/60 |
| 3,649,406 | 3/1972 | McNish | 264/60 |
| 3,877,973 | 4/1975 | Ravoult | 264/62 |
| 3,930,085 | 12/1975 | Pasiuk | 428/319.1 |
| 3,932,161 | 1/1976 | McNish . | |
| 4,338,368 | 7/1982 | Lovelace et al. | 428/311.5 |
| 4,357,387 | 11/1982 | George et al. . | |
| 4,612,240 | 9/1986 | Johnson et al. . | |

FOREIGN PATENT DOCUMENTS 2900225 8/1979 Fed. Rep. of Germany .
1054734 10/1953 France .

Primary Examiner—James C. Cannon
Attorney, Agent, or Firm—Parkhurst & Oliff

[57] ABSTRACT

Ceramic composite material characterized in that it comprises a core of ceramic fibers of which at least one face is coated with a hard and dense ceramic slip covering, of which the coefficient of expansion is compatible with that of the ceramic fibers.

3 Claims, 2 Drawing Figures

CERAMIC COMPOSITE MATERIAL HAVING A CORE OF CERAMIC FIBERS COATED WITH A LAYER OF CERAMIC, AND METHOD OF PRODUCING SAME

The present invention relates to a new type of ceramic composite material having a core or substrate of ceramic fibers; it further relates to a method for producing said material.

For certain applications, such as annealing or calcinations, or even baking, for example in saggars, the object is to design containers in which chemical compounds can be treated, and of which at least the inner surfaces are smooth, impervious to liquids and chemically inert, so as not to pollute the compounds, and also which have a minimum specific heat in order not to cause unnecessary consumptions of energy, especially with discontinuous treatments. It has regretfully been impossible, until now, to produce such containers economically.

Patent DE-A-2 900 225 describes a porous material in ceramic fibers, bonded by mineral cements containing phosphates and metallic oxides, said material being dried and heated at high temperature. This technique is very appreciated for producing rigid insulating parts, but it does not give a smooth, hard, dense, impervious and chemically inert surface condition.

U.S. Pat. No. 4 357 387 proposes to deposit a ceramic material on a fabric by spraying into a plasma. This expensive technique enables to produce very thin, supple, and discontinuous coatings of melted materials, but these coatings are neither rigid nor impervious to liquids.

U.S. Pat. No. 3 395 068 proposes to spray onto a fibrous ceramic material, a clay such as bentonite which is thereafter dried. Such superficial deposit makes the finished part easier to handle, but it does not give the required surface condition, especially as, if the part is heated to a high temperature, the superficial layer peels off after cracking and consequently disappears rapidly.

It is the object of the present invention to overcome the aforesaid drawbacks by proposing a ceramic composite material comprising a core of ceramic fibers of which at least one face is coated with a layer of ceramic. This new composite material is characterized in that the ceramic superficial layer is a slip covering of dense, hard and impervious ceramic, of which the expansion coefficient is compatible with that of the ceramic fibers.

The term "compatible" such as used hereafter in the description and claims, means that the coefficients of thermal expansion of the elementary ceramic fibers, of the part in ceramic fibers and of the slip covering are sufficiently near one to the other not to cause cracks or crackles or in general, the appearance of defects at the level of the interface of said materials or in one of them during either temperature variations or thermal shocks. In practice, a difference of around one percent between the coefficients of expansion of each of said compounds is acceptable for most applications.

Advantageously, the thickness of the ceramic slip covering is between 0.1 and 1 mm.

The invention also relates to the method for producing said composite material, which consists in known manner:

in producing a piece of given shape in ceramic fibers,
in coating at least one of the faces of said piece forming the substrate or core, with a layer of earth material or ceramic material;
and in drying the resulting part.

The method according to the invention is characterized in that the part of ceramic fibers is coated with a slip covering, of which the chemical and thermal properties are compatible with those of the core of ceramic fibers forming the substrate and with the conditions of use and in that after drying of the slip, said superficially coated piece is baked at a temperature high enough to cause the ceramization of said slip.

Advantageously, in practice, the baking is carried out at a temperature higher than the temperature of utilization of the finished composite part.

It is known that :
a "slip" is an aqueous suspension of a ceramic paste;
the "slip covering operation" consists in coating part of or the whole ceramic piece with a thin layer of earth material or ceramic material;
the "slip covering" is the superficial layer resulting from the slip covering operation;
the "ceramization" operation consists in creating ceramic bonds inside a material.

The composite materials according to the invention may have many different shapes. Given that the choice of the ceramic fibers constitutes the basic part, the core of the composite material therefore varies as a function of the required technical specifications, and in particular as a function of the cost and of the temperature at which the finished product must be used. Said ceramic fibers can be of identical nature or all different provided that the coefficient of expansion of the whole remains compatible with the next sequence of the preparation method.

The basic part in ceramic fibers may be treated by any of the known suitable techniques, such as for example, vacuum forming on a mold, or even the techniques described in the French patent applications filed by the Applicant, respectively on Oct. 25, 1984 under No. 84/16 517 entitled "Insulating piece of varied shape, formed by stacking layers of high temperature-withstanding fibers and manufacturing method", and on Dec. 13, 1983 under No. 83/20158, entitled "Method for the production of an insulating fibrous piece and the piece produced according to said method".

For a number of applications, the ceramic fibers may be bonded together by an ordinary mineral bond as indicated hereinabove. The density and thickness of the fibrous piece forming the core or substrate vary as a function of the sought results.

As already indicated, it is important that the coefficient of expansion of said ceramic fibers be compatible with that of the slip covering, namely that it be substantially approximate thereto, so as to obtain a good adherence of the interface between the slip covering and the fibers and not to cause any delamination, fissuring or cracking under the effect of stresses due to temperature or time.

Suitable slip covering, are the slips normally used in ceramics. Said slips can if necessary, be added to appropriate minerals. The selection of said slip takes essentially into account the wanted final properties. In practice, the slip is deposited on a dry piece by known techniques such as quenching, painting, spraying, etc . . . .

Drying is performed in known manner to remove the water from the slip, for example in an electric furnace.

The minimum baking temperature is determined by the slip ceramizing temperature. Normally, baking is performed at a temperature higher than the slip ceramizing temperature and than the temperature at which the finished piece is used, so that said piece can be perfectly stable throughout its use.

After baking, the treated face becomes hard, dense, smooth and impervious to liquids. It adopts exactly the outline of the basic piece forming the core or substrate. Said dense and hard surface does not crumble into dust under frictions. It is all the more smooth that the slip has been more vitrified. Said superficial layer is stable at the utilization temperature and inert towards materials designed to come into contact therewith during use. Said surface is also impervious to liquids and even to most gases. Finally, the finished material is insensitive to thermal shocks.

The invention will be more readily understood on reading the following examples of emdodiment with reference to the accompanying drawings in which.

EXAMPLE 1

Figure 1:
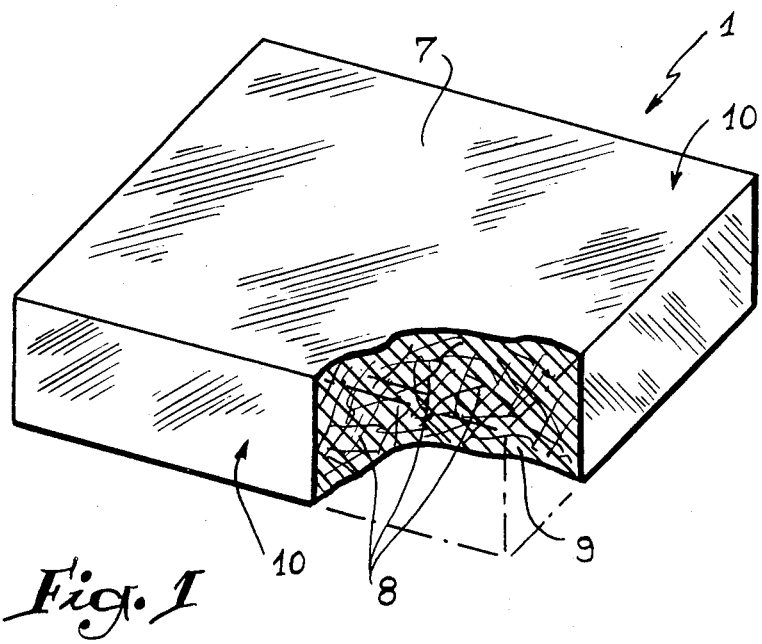
FIG. 1 is a symbolic exploded perspective of a product according to the invention.
Figure 2:
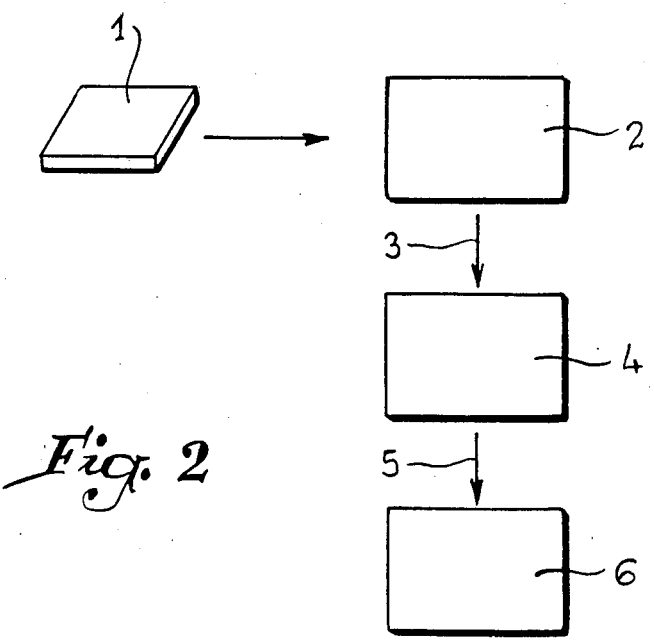
FIG. 2 is a symbolic illustration of the production method according to the invention.

A plate of dimensions $300 \times 200 \times 10$ mm is produced in known manner, from ceramic fibers capable of withstanding a temperature of 1400° C.

Said plate (1) has a density approximating 0.3. This is sufficient to give it a good rigidity and the adequate mechanical resistance for the next sequence of operations.

Said plate (1) is then soaked in a slip currently sold on the market and formed by an aqueous suspension of a mixture of mineral materials having altogether a cordierite composition, of which the compatibility of the expansion coefficient with that of the ceramic fibers of the plate has been priorly tested. Said plate (1) is left to soak until a layer of about 0.5 mm thickness has deposited on the surface thereof.

The plate is then dried in the open or in an electric furnace (4).

The dried piece (5) is thereafter baked in an electric tunnel furnace (6) at 1350° C. for about 4 hours.

The resulting finished piece (7) illustrated in FIG. 1 is insensitive to thermal shocks. It is essentially composed of a core (8) forming a substrate in ceramic fibers (9), coated on all its faces with a fine covering of hard, dense, smooth ceramic slip (10), which is impervious to most gases and has a thickness around 0.4 mm.

EXAMPLE 2

It is proceeded as in Example 1, except that the substrate is container-shaped.

After baking, the container obtained, comprises on all its faces a hard and dense layer (10) and can be used successfully as a crucible or pot for the calcination of carbonates or a reflector in infrared drying installations used in the agri-foodstuffs industry.

EXAMPLE 3

It is proceeded as in Example 1, except that the soaking in the slip (2) is replaced by a spraying operation. The thickness of the sprayed deposit is about 0.5 mm.

After drying (4), the plate (7) then obtained can be used as a baking support for ceramic objects to be treated at temperatures around 1350° C.

EXAMPLE 4

It is proceeded as in Example 1, except that the plate (1) is replaced by a hollow piece of generally truncated shape coupled by its pointed end to a likewise hollow cylinder.

The inside surface of said piece is coated with a slip covering of about 0.8 mm thickness which is subsequently ceramized at 1350° C.

A rigid gas burner is then obtained of which the inside face (10) which is designed to come into contact with the gas flame is hard and perfectly capable of withstanding, without erosion, high speeds of winds.

The technique according to the invention presents many advantages, amongst which:

a simple implementation, without the need of special equipment, such as projection into a plasma for example;

the fact that the pieces obtained are light, rigid and have a low specific heat, this resulting in a substantial saving of energy in the discontinuous production methods;

the fact of combining the advantages of the ceramic fibers, namely the lightness, low specific heat and resistance to thermal shocks, with the advantages of a hard and dense ceramic, namely hardness, cleanliness, imperviousness to liquids and good resistance to frictions and to stress as well as an excellent stability and chemical inertia when used.

What we claim is:

1. A method for producing a fibrous ceramic composite material, comprising:
    forming a dry fibrous substrate of ceramic fibers;
    coating at least one face of said dry substrate with an aqueous suspension of a slip covering to form a coated product, said slip covering having a coefficient of expansion, after baking, which differs from that of said ceramic fibers of the substrate by a maximum of one percent;
    drying said coated product to remove water from said slip covering; and
    baking said dried coated substrate at a sufficient temperature to result in ceramization of said dried slip covering, and recrystallization and ceramization of said ceramic fibers.

2. The method of claim 1, wherein said baking is performed at a temperature of between 1,300° C. and 1,500° C.

3. The method of claim 1, wherein said baking is performed at a temperature slightly higher than the temperature at which the finished composite piece is intended to be used.

* * * * *